(12) United States Patent
Sari et al.

(10) Patent No.: US 8,355,459 B2
(45) Date of Patent: Jan. 15, 2013

(54) METHOD FOR TRANSMITTING AND ESTIMATING SYMBOLS CODED WITH A CODING MATRIX, AND CORRESPONDING RECEIVER AND TRANSMITTER

(75) Inventors: Hikmet Sari, Charenton (FR); Serdar Sezginer, Boulogne-Billancourt (FR)

(73) Assignee: Sequans Communications, Paris la Defense (FR)

( * ) Notice: Subject to any disclaimer, the term of this patent is extended or adjusted under 35 U.S.C. 154(b) by 486 days.

(21) Appl. No.: 12/594,570

(22) PCT Filed: Mar. 27, 2008

(86) PCT No.: PCT/IB2008/001870
§ 371 (c)(1),
(2), (4) Date: Feb. 12, 2010

(87) PCT Pub. No.: WO2008/129427
PCT Pub. Date: Oct. 30, 2008

(65) Prior Publication Data
US 2010/0166099 A1 Jul. 1, 2010

(30) Foreign Application Priority Data
Apr. 2, 2007 (EP) .................................... 07290394

(51) Int. Cl.
*H04B 7/02* (2006.01)
*H04L 1/02* (2006.01)
(52) U.S. Cl. ......... 375/267; 375/299; 375/340; 375/347
(58) Field of Classification Search .......... 375/259–260, 375/267, 295, 299, 316, 340, 347, 349
See application file for complete search history.

(56) References Cited

U.S. PATENT DOCUMENTS
7,715,805 B2 * 5/2010 Gresset et al. ................ 455/101
(Continued)

FOREIGN PATENT DOCUMENTS
EP 1195937 4/2002
(Continued)

OTHER PUBLICATIONS

International Search Report for International Patent Application No. PCT/IB2008/001870; Jan. 6, 2009. Serdar Sezginer, Hikmet Sari, and Ezio Biglieri, "On High-Rate Full Diversity 2×2 Space-Time Codes with Low-Complexity Optimum Detection", IEEE Transactions on Communications, vol. 57, No. 5, May 2009, 10 pages.

*Primary Examiner* — Jean B Corrielus
(74) *Attorney, Agent, or Firm* — Bryan A. Santarelli; Graybeal Jackson LLP

(57) ABSTRACT

An embodiment of a method for transmitting a sequence of symbols through at least a channel in a wireless communication system includes: forming a coding matrix with the sequence of symbols, each component of the coding matrix being a linear combination of two symbols among a first, a second, a third, and a fourth symbol ($s_1, s_2, s_3, s_4$), transmitting a first component and a second component of a first column and of a second column of the coding matrix through a first transmit antenna and a second transmit antenna at a first and a second time slot wherein the coding matrix is defined as $$\begin{pmatrix} as_1 + bs_3 & -cs_2^* - ds_4^* \\ as_2 + bs_4 & cs_1^* + ds_3^* \end{pmatrix},$$

a, b, c, d being complex numbers of modulus 1.

20 Claims, 6 Drawing Sheets

U.S. PATENT DOCUMENTS

| | | | |
|---|---|---|---|
| 8,121,208 B2 * | 2/2012 | Song et al. | 375/262 |
| 2003/0147343 A1 * | 8/2003 | Onggosanusi et al. | 370/209 |
| 2005/0041751 A1 * | 2/2005 | Nir et al. | 375/267 |
| 2005/0105629 A1 | 5/2005 | Hottinen et al. | |
| 2007/0041475 A1 * | 2/2007 | Koshy et al. | 375/340 |
| 2010/0220802 A1 * | 9/2010 | Castelain et al. | 375/267 |

FOREIGN PATENT DOCUMENTS

| | | |
|---|---|---|
| EP | 1376921 | 1/2004 |
| WO | 01/63826 | 8/2001 |
| WO | 02/098051 | 12/2002 |

* cited by examiner

METHOD FOR TRANSMITTING AND ESTIMATING SYMBOLS CODED WITH A CODING MATRIX, AND CORRESPONDING RECEIVER AND TRANSMITTER

PRIORITY CLAIM

The instant application is a US National Phase Application pursuant to 35 USC §371 of International Patent Application No. PCT/IB2008/001870, entitled METHOD FOR TRANSMITTING AND ESTIMATING SYMBOLS CODED WITH A CODING MATRIX, AND CORRESPONDING RECEIVER AND TRANSMITTER, filed Mar. 27, 2008; which application claims priority European Patent Application No. 07290394.1, entitled METHOD FOR TRANSMITTING AND ESTIMATING SYMBOLS CODED WITH A CODING MATRIX, AND CORRESPONDING RECEIVER AND TRANSMITTER, filed Apr. 2, 2007; which applications are incorporated herein by reference in their entireties.

TECHNICAL FIELD

An embodiment of the present invention pertains to wireless communication using multi-antennas techniques commonly referred to as Multi-Input Multi-Output techniques and using reception diversity technique.

An embodiment of the invention is particularly adapted to a space-time coding described by a two-by-two coding matrix transmitting four symbols using two transmit antennas and two consecutive symbol intervals.

BACKGROUND

An embodiment of the invention relates notably to a method for transmitting a sequence of symbols through at least a channel in a wireless communication system, the sequence of symbols comprising at least a first, a second, a third and a fourth symbols, the value of each symbol belonging to at least a signal constellation, the method comprising at least the steps of:
- forming a coding matrix with said sequence of symbols, each component of the coding matrix being a linear combination of two symbols among the first, the second, the third and the fourth symbols,
- transmitting a first and a second components of a first column of the coding matrix through respectively a first and a second transmit antennas at a first time slot,
- transmitting a first and a second components of a second column of the coding matrix through respectively the first and the second transmit antennas at a second time slot.

Multiple antenna techniques commonly known as MIMO (Multi-Input Multi-Output) have become very popular for wireless applications. Such techniques have been included for example in the technical specifications recently developed for wireless local area networks and metropolitan area networks. MIMO techniques may be used to provide spatial diversity and enhance robustness to signal fading, or to provide spatial multiplexing and increase throughput on the wireless channel, or to provide both.

Figure 1:
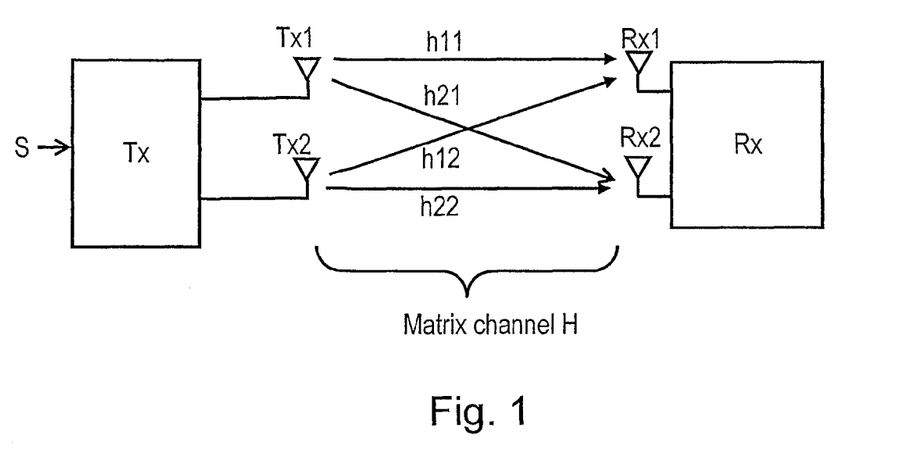
FIG. 1 shows a general block diagram of a MIMO system with two transmit antennas and two receive antennas.

In MIMO systems, transmitter Tx, as well as receiver Rx are equipped with multiple antennas. In the MIMO system illustrated in FIG. 1, the transmitter Tx and the receiver Rx are both equipped, for example, with respectively a first and a second transmit antennas, Tx1 and Tx2, and a first and a second receive antennas, Rx1 and Rx2.

Among the numerous solutions proposed in the literature for MIMO profiles for the downlink channel (from a base station to mobile users), the IEEE 802.16-2005 specifications (IEEE being the acronym for Institute of Electrical and Electronics Engineer) proposes a full-rate and full-diversity space-time code (STC) of dimension 2×2 described by a matrix C defined as:

$$C = \frac{1}{\sqrt{1+r^2}} \begin{bmatrix} s_1 + jrs_4 & rs_2 + s_3 \\ s_2 - rs_3 & jrs_1 + s_4 \end{bmatrix},$$

$$\text{where } r = \frac{-1+\sqrt{5}}{2},$$

$s_1, s_2, s_3, s_4$ are respectively a first, a second, a third and a fourth symbols.

At the transmitter side, using the space-time code described by the matrix C in the MIMO system for transmitting an input signal S formed with a plurality of symbols mapped in at least a signal constellation (for example 16-QAM signal constellation or 64-QAM signal constellation, QAM being the acronym for Quadrature Amplitude Modulation), consists in:
- grouping the symbols four by four to form quadruplets of symbols to be transmitted,
- selecting a quadruplet of symbol $(s_1,s_2,s_3,s_4)$ to be transmitted, and forming the matrix C with this quadruplet of symbols, and
- transmitting the first and the second column of said matrix C respectively at a first and a second time slots (corresponding to a given symbol period) through the first and the second transmit antennas Tx1, Tx2.

At the receiver side, to estimate the incoming signal, the receiver evaluates the maximum likelihood function for all quadruplets of symbols $(s_1,s_2,s_3,s_4)$ of the signal constellation and selects the one which minimizes this function. The maximum likelihood function used to evaluate the quadruplets of symbols is actually the squared Euclidean distance between the received noisy signal and the noiseless signal corresponding to that quadruplet.

Even if the matrix C is a space-time code which leads to a spatial diversity of order four, a potential problem of this space-time code is its inherent complexity. Indeed, for a signal constellation with M points, M being a positive integer, the optimum receiver hence involves the computation of $M^4$ Euclidean distances and selects the quadruplet of symbols minimizing this distance. The receiver complexity is therefore proportional to $16^4 = 65536$ for a 16-QAM signal constellation, and to $64^4 = 16777216$ for a 64-QAM signal constellation. This may be prohibitive in practical applications, and, therefore, one may need to resort to suboptimum receivers which degrade performance.

SUMMARY

An embodiment of the invention is a method for estimating an incoming signal exempt from at least one of the drawbacks previously mentioned.

An embodiment of the invention allows notably the use of a space-time code which does not involve the computation of $M^4$ Euclidean distances in an optimum receiver, and in which the complexity is reduced, for example, to the square of the size of signal constellation.

For this purpose, an embodiment of the invention is a method for transmitting a sequence of symbols through at least a channel in a wireless communication system, the sequence of symbols comprising at least a first, a second, a third, and a fourth symbol, the value of each symbol belonging to at least a signal constellation, the method comprising at least the steps of:

coding by forming a coding matrix with said sequence of symbols, each component of the coding matrix being a linear combination of two symbols among the first, the second, the third and the fourth symbols, transmitting a first and a second components of a first column of the coding matrix through respectively a first and a second transmit antennas, at a first time slot, transmitting a first and a second components of a second column of the coding matrix through respectively the first and the second transmit antennas, at a second time slot, characterized in that the coding matrix is defined as:

$$\begin{pmatrix} as_1 + bs_3 & -cs_2^* - ds_4^* \\ as_2 + bs_4 & cs_1^* + ds_3^* \end{pmatrix},$$

$s_1$, $s_2$, $s_3$, $s_4$ being respectively the first, the second, the third, and the fourth symbols, the star designating the complex conjugate, and a, b, c, d being complex numbers of modulus 1.

Another embodiment of the invention is a device for transmitting an input signal through at least a propagation channel in a wireless, implementing at least the transmission method described above.

Another embodiment of the invention is a method for estimating an incoming signal corresponding to a sequence of symbols coded with a coding matrix and transmitted through a propagation channel, the sequence of symbols comprising at least a first, a second, a third, and a fourth symbol, the value of each symbol belonging to at least a signal constellation. Each component of the coding matrix being a linear combination of two symbols among the first, the second, the third and the fourth symbols, a first and a second components of a first column of the coding matrix being transmitted respectively through a first and a second transmit antennas at a first time slot, a first and a second components of a second column of the coding matrix being transmitted respectively through the first and the second transmit antennas at a second time slot. The propagation channel being defined by a channel matrix comprising components representing a propagation channel response between the first transmit antenna and at least a first and a second receive antennas, and between the second transmit antenna and at least the first and the second receive antennas, the said method comprising at least the steps of:

computing a first intermediate signal from the incoming signal, said first intermediate signal being a first affine function in which the variable is the first symbol, computing a second intermediate signal from the incoming signal, said second intermediate signal being a second affine function in which the variable is the second symbol, estimating the value of the first symbol from the first intermediate signal, estimating the value of the second symbol from the second intermediate signal, selecting a set of couples of values, each couple of values consisting in the values of two symbols belonging to the signal constellation, for each couple of values selected, calculating a Euclidean distance between the incoming signal and a noiseless signal, the noiseless signal being defined as the product of the channel matrix and the coding matrix corresponding to the selected couple of values and the estimated values of the first and the second, selecting the minimal Euclidean distance among the Euclidean distances respectively calculated for the different selected couples of values, and selecting the values of the first, second, third and fourth symbols corresponding to the selected minimum Euclidean distance.

Therefore, methods according to embodiments of the invention, allow the implementation of a full-rate and full-diversity 2×2 space-time code whose optimum receiver has a complexity that is only proportional to the square of the signal constellation used. Thus, the number of Euclidean distance computations in the optimum detector is reduced to $16^2=256$ for a 16-QAM signal constellation and to $64^2=4096$ for a 64-QAM signal constellation.

Of course, an embodiment of such a method may be used with different signal constellations and with an arbitrary number of receive antennas.

The coding matrix may be defined as:

$$\begin{pmatrix} as_1 + bs_3 & -cs_2^* - ds_4^* \\ as_2 + bs_4 & cs_1^* + ds_3^* \end{pmatrix},$$

$s_1$, $s_2$, $s_3$, $s_4$ being respectively the first, the second, the third and the fourth symbols, the star designating the complex conjugate, and a, b, c, d being complex numbers of modulus 1.

The incoming signal may comprise components representing signals received at least by the first and the second receive antennas at the first and the second time slots.

The first and the second intermediate signals may be computed by performing at least:

step A: for each component of the incoming signal, removing terms depending of the third and the fourth symbols which are present in said component of the incoming signal, step B1: for each result of step A, multiplying said result by one of the components of the channel matrix or by the complex conjugate of one of the components of the channel matrix, so that the coefficient of the first symbol contains a square modulus term, step B2: for each result of step A, multiplying said result by one of the components of the channel matrix or by the complex conjugate of one of the components of the channel matrix, so that the coefficient of the second symbol contains a square modulus term, step C1: computing the first intermediate signal by using all the results of step B1, step C2: computing the second intermediate signal by using all the results of step B2.

The slope of the affine functions of the first intermediate signal may be the sum of all the square modulus of the components of the channel matrix.

The slope of the affine functions of the second intermediate signal may be the sum of all the square modulus of the components of the channel matrix.

For example, the set of couples of values includes all the couple of values belonging to the signal constellation.

The third symbol may be identical to the fourth symbol.

An embodiment of the method may further use the first, the second, a third, and a fourth receive antenna.

Another embodiment of the invention is a device for estimating an incoming signal, implementing at least the estimation method described above.

Thus, an embodiment of the invention allows notably the implementation of full-rate and full-diversity 2×2 space-time code with optimum receiver,

BRIEF DESCRIPTION OF THE DRAWINGS

Other features and advantages of one or more embodiments of the invention will appear more clearly from the description made hereinafter, given by way of example only, with reference to the accompanying drawings, wherein.

DETAILED DESCRIPTION

Figure 2:
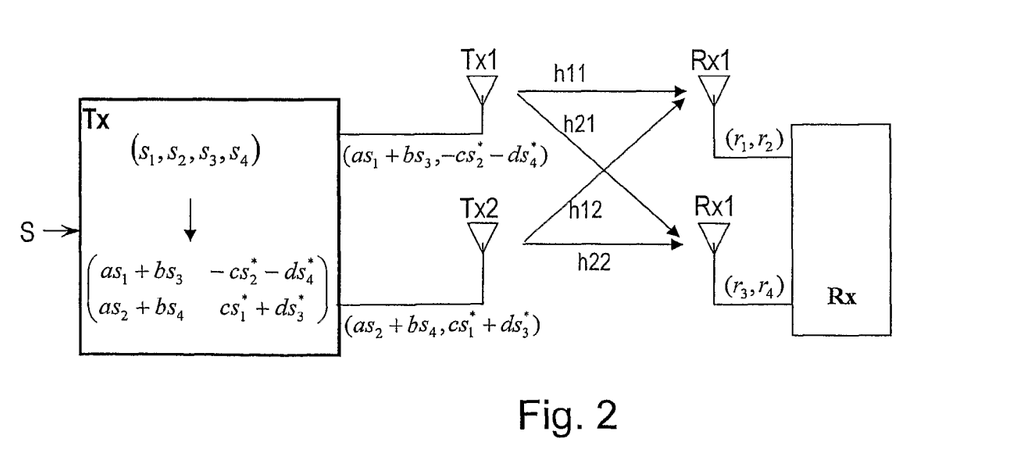
FIG. 2 shows a general block diagram of a 2×2 MIMO system incorporating the space time code according to an embodiment of the invention.

According to an embodiment of the invention, and referring to FIG. 2, a receiver Rx and a transmitter Tx are equipped, for example, with respectively two receive antennas Rx1, Rx2 and two transmit antennas Tx1, Tx2.

At the transmitter Tx side, an input signal S is fed into the transmitter Tx, which performs, for example, coding and modulation to provide, from the input signal, a sequence of symbols. The value of each symbol belongs to a signal constellation. This sequence of symbols are grouped four by four to form a sequence of symbol quadruplets $(s_1,s_2,s_3,s_4)$, $s_1$, $s_2$, $s_3$, $s_4$ designating respectively a first, a second, a third, and a fourth symbol.

For each quadruplet of symbols $(s_1,s_2,s_3,s_4)$, a coding matrix is formed as follows:

$$CM = \begin{pmatrix} as_1 + bs_3 & -cs_2^* - ds_4^* \\ as_2 + bs_4 & cs_1^* + ds_3^* \end{pmatrix}, \quad (1a)$$

a, b, c, d being complex numbers of modulus 1 and the star designating complex conjugate.

Each component of the coding matrix CM being a linear combination of two symbols among the first, the second, the third and the fourth symbols $s_1$, $s_2$, $s_3$, $s_4$, the value of each symbol belonging at least to the signal constellation. The first column of the coding matrix represents the linear symbols combinations transmitted at a first time slot T1, and the second column of the coding matrix represents the linear symbols combinations transmitted at a second time slot T2. The first and the second time slots may be two consecutive symbol intervals. The first row of the coding matrix gives the linear symbol combinations transmitted through the first transmit antenna Tx1, and the second row of the coding matrix gives the linear symbol combinations transmitted through the second transmit antenna Tx2. In other words, $as_1+bs_3$ is transmitted through the first transmit antenna Tx1 at the first time slot T1 (or symbol interval), $as_2+bs_4$ is transmitted through the second transmit antenna Tx2 at the first time slot T1, $-cs_2^*-ds_4^*$ is transmitted through the first transmit antenna Tx1 at the second time slot T2, and $cs_1^*+ds_3^*$ is transmitted through the second transmit antenna Tx2 at the second time slot T2.

At the receiver side, the linear symbols combinations are captured by the two receive antennas, Rx1 and Rx2. The received signal R, or incoming signal, received during the first and the second time slot, may be theoretically expressed in matrix form as:

$$R = \begin{bmatrix} r_1 & r_2 \\ r_3 & r_4 \end{bmatrix} = \begin{bmatrix} h_{11} & h_{12} \\ h_{21} & h_{22} \end{bmatrix} \begin{bmatrix} as_1 + bs_3 & -cs_2^* - ds_4^* \\ as_2 + bs_4 & cs_1^* + ds_3^* \end{bmatrix} + \begin{bmatrix} n_1 & n_2 \\ n_3 & n_4 \end{bmatrix} = \quad (1b)$$
$$H \cdot MC + N$$

where:
- $r_1$ and $r_2$ represent the signals received on the first receive antenna Rx1 at respectively the first and the second time slots;
- $r_3$ and $r_4$ represent the signals received on the second receive antenna Rx2 at respectively the first and the second time slots;
- H is a channel matrix, in which $h_{ji}$ represents the propagation channel response between the $i^{th}$ transmit antenna and the $j^{th}$ receive antenna, j and i being integers,
- N is a noise term matrix, in which $n_j$ represents the additive noise term affecting the signals on the first and the second receive antenna at the first and the second time slots.

Thus, on the first receive antenna Rx1, the two signals received at the first and second time slots are:

$$r_1 = h_{11}(as_1+bs_3) + h_{12}(as_2+bs_4) + n_1 \quad (2.a)$$

$$r_2 = h_{11}(-cs_2^*-ds_4^*) + h_{12}(cs_1^*+ds_3^*) + n_2 \quad (2.b)$$

Similarly, on the second receive antenna Rx2, the two signals received at the first and second time slots are:

$$r_3 = h_{21}(as_1+bs_3) + h_{22}(as_2+bs_4) + n_3 \quad (3.a)$$

$$r_4 = h_{21}(-cs_2^*-ds_4^*) + h_{22}(cs_1^*+ds_3^*) + n_4 \quad (3.b)$$

To recover the quadruplet of symbols $(s_1,s_2,s_3,s_4)$ transmitted from the received signal R, the receiver Rx seeks the most probable transmitted quadruplet of symbols. For this purpose, an optimum detector of the receiver makes an exhaustive search over all possible values of the transmitted symbols and decides in favor of a quadruplet of symbols which minimizes the Euclidean distance:

$$D(s_1,s_2,s_3,s_4) = \{|r_1 - h_{11}(as_1+bs_3) - h_{12}(as_2+bs_4)|^2 + |r_2 - h_{11}(-cs_2^*-ds_4^*) - h_{12}(cs_1^*+ds_3^*)|^2 + |r_3 - h_{21}(as_1+bs_3) - h_{22}(as_2+bs_4)|^2 + |r_4 - h_{21}(-cs_2^*-ds_4^*) - h_{22}(cs_1^*+ds_3^*)|^2\} \quad (4)$$

If M designates the size of the signal constellation, an exhaustive search involves the computation of $M^4$ metrics and $M^4-1$ comparisons, which may be excessive for the 16-QAM and 64-QAM signal constellations.

Figure 5:
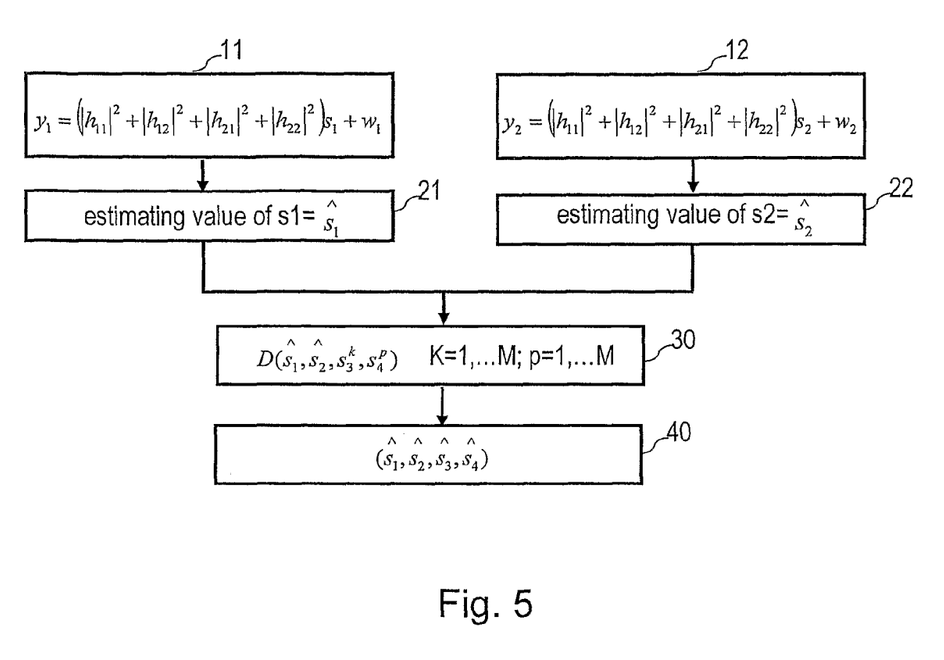
FIG. 5 is a flow chart showing the general steps of an embodiment of the estimation method to be performed in MIMO system with two receive antennas.
Figure 6:
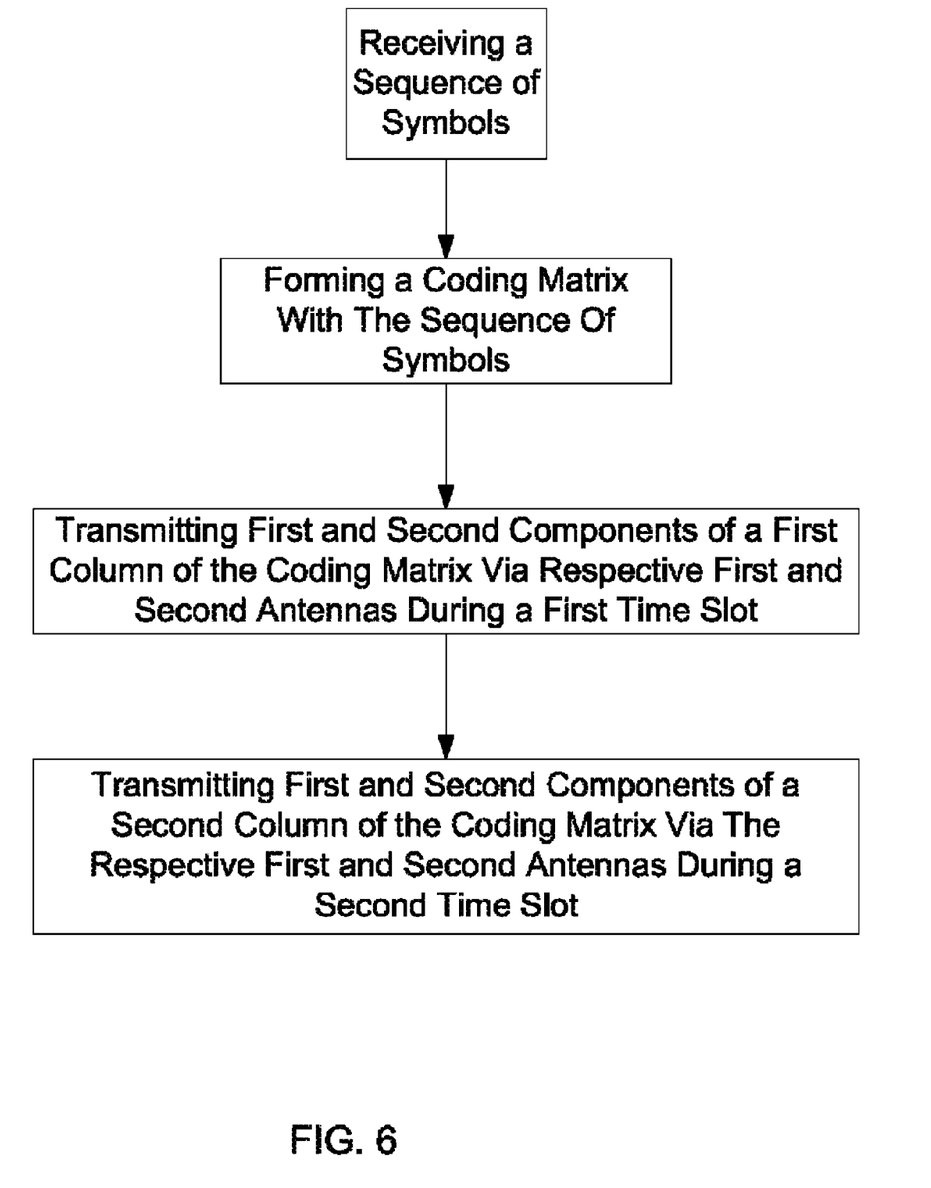
FIG. 6 is a flow chart showing the general steps of an embodiment of a method for transmitting a sequence of symbols that includes at least first, second, third, and fourth symbols.
Figure 7:
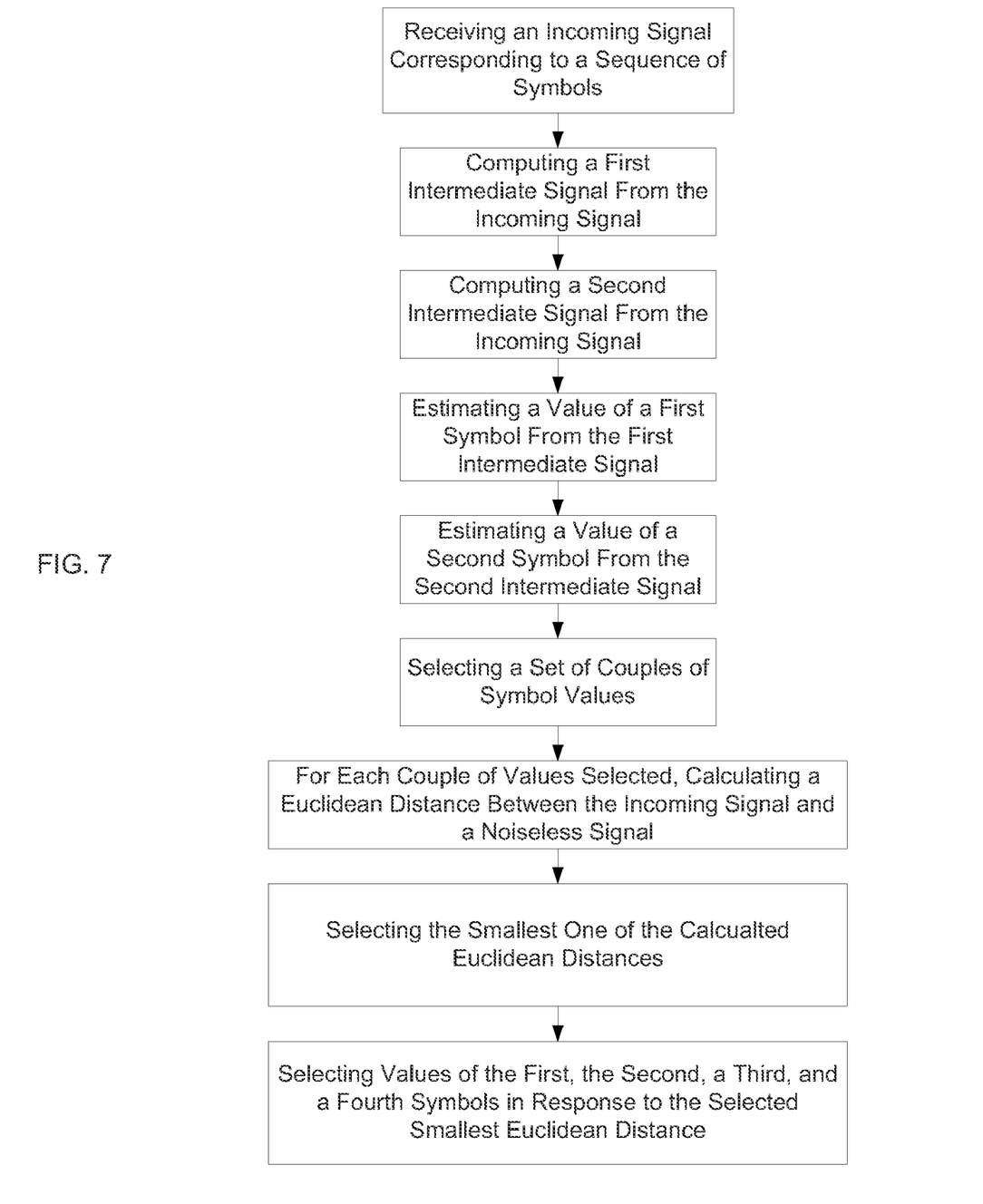
FIG. 7 is a flow chart showing the general steps of an embodiment of a method for estimating an incoming signal corresponding to a sequence of symbols that includes at least first, second, third, and fourth symbols.

To reduce the complexity, the receiver may perform the following method:

- computing 11 a first intermediate signal $y_1$ from the received signal, the first intermediate signal $y_1$ being a first affine function in which the variable is for example the first symbol $s_1$,
- computing 12 a second intermediate signal $y_2$ from the received signal, the second intermediate signal $y_2$ being a second affine function in which the variable is the second symbol $s_2$,
- estimating 21 the value of the first symbol $s_1$ from the first intermediate signal $y_1$,
- estimating 22 the value of the second symbol $s_2$ from the second intermediate signal $y_2$,
- selecting a set of couples of values, each couple of values consisting of the values of two symbols belonging to the signal constellation,
- for each couple of values selected, calculating 30 a Euclidean distance between the incoming signal and a noiseless signal, the noiseless signal being defined as the product of the channel matrix H and the coding matrix CM corresponding to the selected couple of values and the estimated values of the first and the second symbols $s_1$, $s_2$,
- selecting the minimal Euclidean distance among the Euclidean distances respectively calculated for the different selected couples of values, and
- selecting 40 the values of the first, second, third, and fourth symbols $s_1$, $s_2$, $s_3$, $s_4$ corresponding to the selected minimum Euclidean distance.

Figure 8:
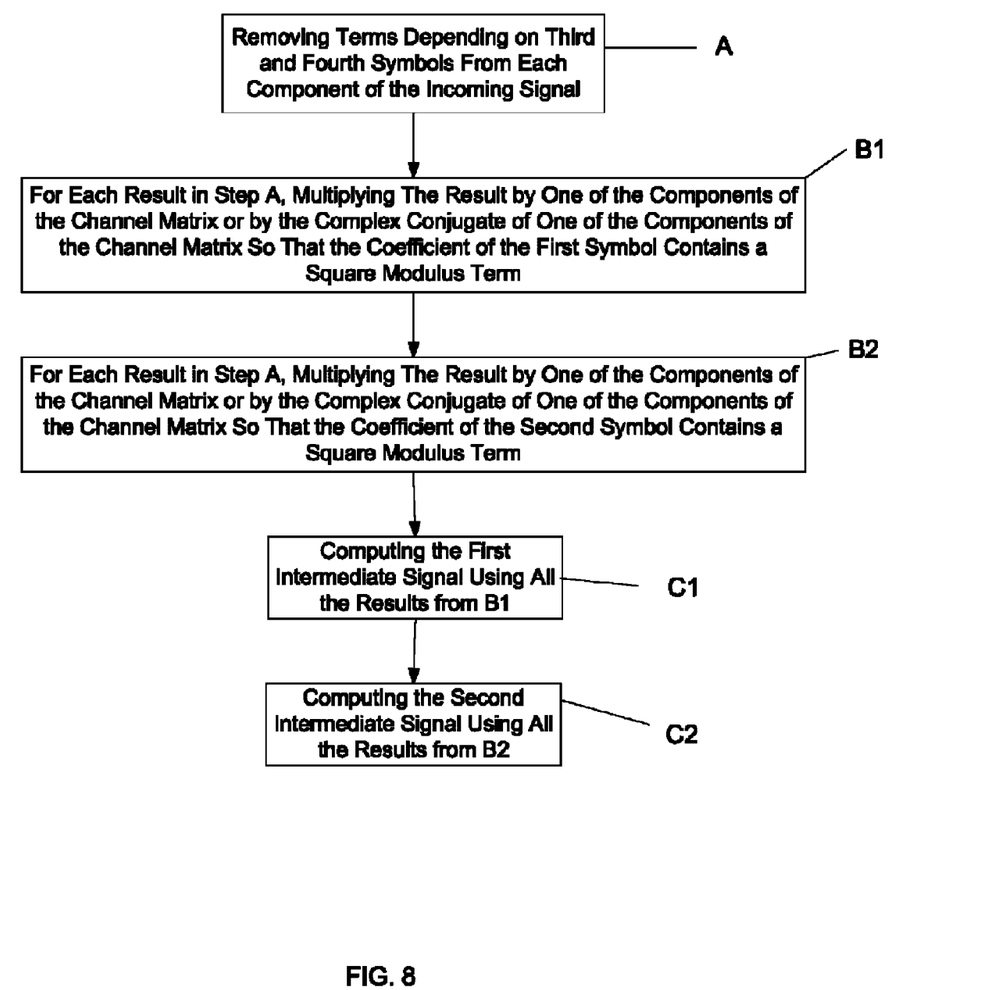
FIG. 8 is a flow chart showing the general steps of an embodiment of a method for computing the first and second intermediate signals of FIG. 7.

To compute the first and the second intermediate signal, a processor PROC of the receiver Rx may perform the following operations:

step A: for each component of the incoming signal, removing terms depending of the third and the fourth symbols ($s_3$, $s_4$) which are present in said component of the received signal: for instance, from the received signal samples ($r_1, r_2, r_3, r_4$), the following signals may be computed:

$$x_1 = r_1 - b(h_{11}s_3 + h_{12}s_4) = a(h_{11}s_1 + h_{12}s_2) + n_1 \quad (5.a)$$

$$x_2 = r_2 - d(h_{12}s^*_3 - h_{11}s^*_4) = c(h_{12}s^*_1 - h_{11}s^*_2) + n_2 \quad (5.b)$$

$$x_3 = r_3 - b(h_{21}s_3 + h_{22}s_4) = a(h_{21}s_1 + h_{22}s_2) + n_3 \quad (5.c)$$

$$x_4 = r - d(h_{22}s^*_3 - h_{21}s^*_4) = c(h_{22}s^*_1 - h_{21}s^*_2) + n_4 \quad (5.d)$$

step B1: for each result of step A, multiplying said result by one of the components of the channel matrix or by the complex conjugate of one of the components of the channel matrix, so that the coefficient of the first symbol contains a square modulus term: for instance, from ($x_1, x_2, x_3, x_4$), following signals may be computed:

$$h^*_{11}x_1 = a(|h_{11}|^2 s_1 + h^*_{11}h_{12}s_2) + h^*_{11}n_1 \quad (6.a)$$

$$h_{12}x^*_2 = c^*(|h_{12}|^2 s_1 - h^*_{11}h_{12}s_2) + h_{12}n^*_2 \quad (6.b)$$

$$h^*_{21}x_3 = a(|h_{21}|^2 s_1 + h^*_{21}h_{22}s_2) + h^*_{21}n_3 \quad (6.c)$$

$$h_{22}x^*_4 = c^*(|h_{22}|^2 s_1 - h^*_{21}h_{22}s_2) + h_{22}n^*_4 \quad (6.d)$$

step B2: for each result of step A, multiplying said result by one of the components of the channel matrix or by the complex conjugate of one of the components of the channel matrix, so that the coefficient of the second symbol contains a square modulus term: for instance, from ($x_1, x_2, x_3, x_4$), the following signals may be computed:

$$h^*_{12}x_1 = a(h_{11}h^*_{12}s_1 + |h_{12}|^2 s_2) + h^*_{12}n_1 \quad (8.A)$$

$$h_{11}x^*_2 = c^*(h_{11}h^*_{12}s_1 - |h_{11}|^2 s_2) + h_{11}n^*_2 \quad (8.B)$$

$$h^*_{22}x_3 = a(h_{21}h^*_{22}s_1 + |h_{22}|^2 s_2) + h^*_{22}n_3 \quad (8.C)$$

$$h_{21}x^*_4 = c^*(h_{21}h^*_{22}s_1 - |h_{21}|^2 s_2) + h_{21}n^*_4 \quad (8.D)$$

step C1: computing the first intermediate signal $y_1$ by using all the results of step B1: for instance, the first intermediate signal may be given by:

$$y_1 = (h^*_{11}x_1 + h^*_{21}x_3)/a + (h_{12}x^*_2 + h_{22}x^*_4)/c^* \quad (7)$$
$$= (|h_{11}|^2 + |h_{12}|^2 + |h_{21}|^2 + |h_{22}|^2)s_1 + w_1$$

with $$w_1 = (h^*_{11}n_1 + h^*_{21}n_3)/a + (h_{12}n^*_2 + h_{22}n^*_4)/c^*.$$

The first intermediate signal $y_1$ has no terms involving the second symbol $s_2$, and the coefficient of the term in the first symbol $s_1$ clearly indicates that estimation of the first symbol $s_1$ benefits from full fourth-order spatial diversity.

step C2: computing the second intermediate signal $y_2$ by using all the results of step B2: for instance, the second intermediate signal may be given by:

$$y_2 = (h^*_{12}x_1 + h^*_{22}x_3)/a - (h_{11}x^*_2 + h_{21}x^*_4)/c^* \quad (9)$$
$$= (|h_{11}|^2 + |h_{12}|^2 + |h_{21}|^2 + |h_{22}|^2)s_2 + w_2$$

with $$w_2 = (h^*_{12}n_1 + h^*_{22}n_3)/a - (h_{11}n^*_2 + h_{21}n^*_4)/c^*.$$

The second intermediate signal $y_2$ has no terms involving the first symbol $s_1$, and the coefficient of the term in the second symbol $s_2$ shows that estimation of the second symbol $s_2$ benefits from full fourth-order spatial diversity.

Figure 3:
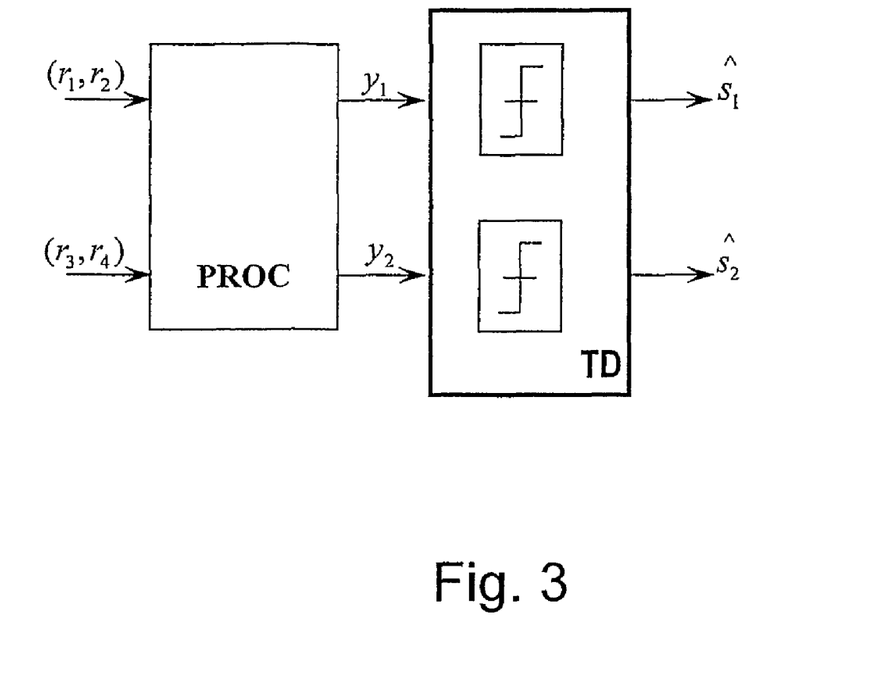
FIG. 3 shows an embodiment of one stage of a receiver processing the incoming signal to determine the maximum-likelihood estimate of first and second symbols.

Therefore, as illustrated in FIG. 3, the first intermediate signal $y_1$ is sent to a threshold detector TD of the receiver Rx, which generates the maximum likelihood estimate of the value of the first symbol and is denoted $\hat{s}_1$. By sending the second intermediate signal $y_2$ to the threshold detector TD, the maximum likelihood estimate of the second symbol is obtained and is denoted $\hat{s}_2$.

Figure 4:
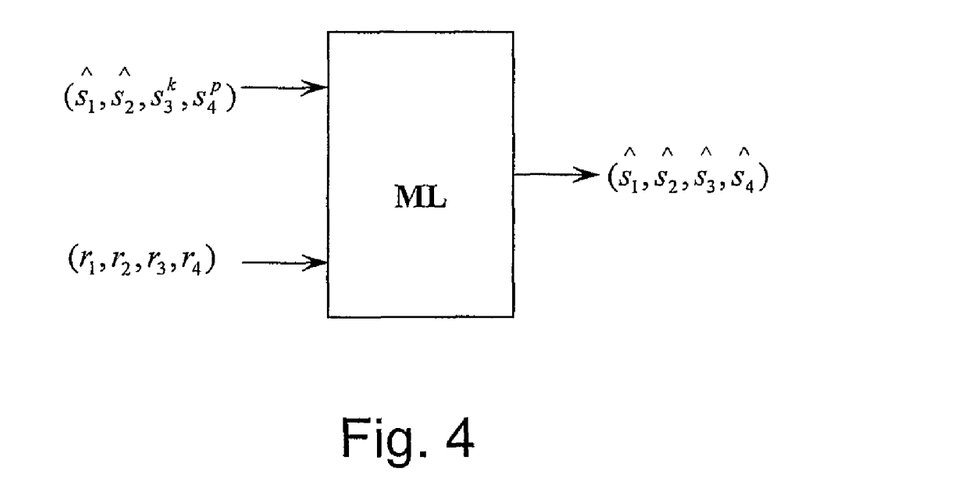
FIG. 4 illustrates an embodiment of another stage of the receiver processing the incoming signal to determine the maximum-likelihood estimate of third and fourth symbols.

Now, as shown in FIG. 4, instead of computing the Euclidean distances $D(s_1, s_2, s_3, s_4)$ for all possible values of the first, the second, the third, and the fourth symbols, a maximum likelihood estimator (ML) of the receiver may only compute the Euclidean distances $D(\hat{s}_1, \hat{s}_2, s_3, s_4)$ for the quadruplets of symbols formed with the estimated value of the first symbol, the estimated value of the second symbol, and the values of the third and the fourth symbols spanning the signal constellation. Specifically, let ($s_3^k, s_4^p$) indicate that the third symbol $s_3$ takes the $k^{th}$ point of the signal constellation and the fourth symbol $s_4$ takes the $p^{th}$ point of the signal constellation. The receiver computes the Euclidean distance $D(s_1, s_2, s_3, s_4)$ for each quadruplet of symbols ($\hat{s}_1, \hat{s}_2, s_3^k, s_4^p$), where k=1,2, ... M, and p=1,2, ..., M, M being the size of the signal constellation. Then, the receiver selects the minimal Euclidean distance among the Euclidean distances respectively calculated for the different selected quadruplet, and selects the values of the first, second, third and fourth symbols corresponding to the selected minimum Euclidean distance.

The a, b, c, d parameters in the code matrix CM are design parameters which may be optimized to maximize the coding gain.

According to another embodiment of the invention, instead of estimating the values of the first and the second symbols and then computing the Euclidean distances $D(s_1,s_2,s_3,s_4)$ for all the quadruplets $(\hat{s}_1,\hat{s}_2,s_3^k,s_4^p)$, the receiver may first estimate the values of the third and the fourth symbols and then compute the Euclidean distances $D(s_1,s_2,s_3,s_4)$ for all the quadruplets $(s_1^k,s_2^p,\hat{s}_3,\hat{s}_4)$, and select the quadruplet minimizing the Euclidean distance.

According to another embodiment of the invention, the method previously described is applied to a MIMO system comprising two transmit antennas Tx1, Tx2 and more than two receive antennas, for example four receive antennas Rx1, Rx2, Rx3, Rx4.

In this case, on the first receive antenna Rx1, the two signals received at the first and second time slot are:

$$r_1 = h_{11}(as_1+bs_3)+_{12}(as_2+bs_4)+n_1 \quad (10.a)$$

$$r_2 = h_{11}(-cs^*_2-ds^*_4)+h_{12}(cs^*_1+ds^*_3)+n_2 \quad (10.b)$$

On the second receive antenna Rx2, the two signals received at the first and second time slot are:

$$r_3 = h_{21}(as_1+bs_3)+h_{22}(as_2+bs_4)+n_3 \quad (11.a)$$

$$r_4 = h_{21}(-cs^*_2-ds^*_4)+h_{22}(cs^*_1+ds^*_3)+n_4 \quad (11.b)$$

Similarly, on the third receive antenna Rx3, the two signals received at the first and second time slot are:

$$r_5 = h_{31}(as_1+bs_3)+h_{32}(as_2+bs_4)+n_5 \quad (12.a)$$

$$r_6 = h_{31}(-cs^*_2-ds^*_4)+h_{32}(cs^*_1+ds^*_3)+n_6 \quad (12.b)$$

Finally, on the fourth receive antenna Rx4, the two signals received at the first and second time slot are:

$$r_7 = h_{41}(as_1+bs_3)+h_{42}(as_2+bs_4)+n_7 \quad (13.a)$$

$$r_8 = h_{41}(-cs^*_2-ds^*_4)+h_{42}(cs^*_1+ds^*_3)+n_8 \quad (13.b)$$

From the received signal samples $(r_1,r_2,r_3,r_4,r_5,r_6,r_7,r_8)$, the processor of the receiver may compute the following signals:

$$x_1 = r_1 - b(h_{11}s_3+h_{12}s_4) = a(h_{11}s_1+h_{12}s_2)+n_1 \quad (14.a)$$

$$x_2 = r_2 - d(h_{12}s^*_3-h_{11}s^*_4) = c(h_{12}s^*_1-h_{11}s^*_2)+n_2 \quad (14.b)$$

$$x_3 = r_3 - b(h_{21}s_3+h_{22}s_4) = a(h_{21}s_1+h_{22}s_2)+n_3 \quad (14.c)$$

$$x_4 = r_4 - d(h_{22}s^*_3-h_{21}s^*_4) = c(h_{22}s^*_1-h_{21}s^*_2)+n_4 \quad (14.d)$$

$$x_5 = r_5 - b(h_{31}s_3+h_{32}s_4) = a(h_{31}s_1+h_{32}s_2)+n_5 \quad (14.e)$$

$$x_6 = r_6 - d(h_{32}s^*_3-h_{31}s^*_4) = c(h_{32}s^*_1-h_{31}s^*_2)+n_6 \quad (14.f)$$

$$x_7 = r_7 - b(h_{41}s_3+h_{42}s_4) = a(h_{41}s_1+h_{42}s_2)+n_7 \quad (14.g)$$

$$x_8 = r_8 - d(h_{42}s^*_3-h_{41}s^*_4) = c(h_{42}s^*_1-h_{41}s^*_2)+n_8 \quad (14.h)$$

Next, from $(x_1,x_2,x_3,x_4,x_5,x_6,x_7,x_8)$, the following signals may be computed:

$$h^*_{11}x_1 = a(|h_{11}|^2 s_1+h^*_{11}h_{12}s_2)+h^*_{11}n_1 \quad (15.a)$$

$$h_{12}x^*_2 = a^*(|h_{12}|^2 s_1-h^*_{11}h_{12}s_2)+h_{12}n^*_2 \quad (15.b)$$

$$h^*_{21}x_3 = a(|h_{21}|^2 s_1+h^*_{21}h_{22}s_2)+h^*_{21}n_3 \quad (15.c)$$

$$h_{22}x^*_4 = c^*(|h_{22}|^2 s_1-h^*_{21}h_{22}s_2)+h_{22}n^*_4 \quad (15.d)$$

$$h^*_{31}x_5 = a(|h_{31}|^2 s_1+h^*_{31}h_{32}s_2)+h^*_{31}n_5 \quad (15.e)$$

$$h_{32}x^*_6 = c^*(|h_{32}|^2 s_1-h^*_{31}h_{32}s_2)+h_{32}n^*_6 \quad (15.f)$$

$$h^*_{41}x_7 = a(|h_{41}|^2 s_1+h^*_{41}h_{42}s_2)+h^*_{41}n_7 \quad (15.g)$$

$$h_{42}x^*_8 = c^*(|h_{42}|^2 s_1-h^*_{41}h_{42}s_2)+h_{42}n^*_8 \quad (15.h)$$

From those signals, the first intermediate signal may be given by:

$$\begin{aligned} y_1 &= (h^*_{11}x_1 + h^*_{21}x_3 + h^*_{31}x_5 + h^*_{41}x_7)/a + \\ &\quad (h_{12}x^*_2 + h_{22}x^*_4 + h_{32}x^*_6 + h_{42}x^*_8)/c^* \\ &= (|h_{11}|^2 + |h_{12}|^2 + |h_{21}|^2 + |h_{22}|^2 + \\ &\quad |h_{31}|^2 + |h_{32}|^2 + |h_{41}|^2 + |h_{42}|^2)s_1 + w_1 \end{aligned} \quad (16)$$

With $$w_1 = (h^*_{11}n_1 + h^*_{21}n_3 + h^*_{31}n_5 + h^*_{41}n_7)/a + (h_{12}n^*_2 + h_{22}n^*_4 + h_{32}n^*_6 + h_{42}n^*_8)/c^*.$$

The first intermediate signal $y_1$ has no terms involving the second symbol $s_2$ and the coefficient of the term in the first symbol $s_1$ clearly indicates that estimation of the first symbol $s_1$ benefits from full eight-order spatial diversity. The first intermediate signal $y_1$ is sent to the threshold detector TD of the receiver, which generates an estimation of the value of the first symbol, denoted $\hat{s}_1$.

Similarly, for the second intermediate signal $y_2$, the following signals may be computed:

$$h^*_{12}x_1 = a(h_{11}h^*_{12}s_1+|h_{12}|^2 s_2)+h^*_{12}n_1 \quad (17.a)$$

$$h_{11}x^*_2 = c^*(h_{11}h^*_{12}s_1-|h_{11}|^2 s_2)+h_{11}n^*_2 \quad (17.b)$$

$$h^*_{22}x_3 = a(h_{21}h^*_{22}s_1+|h_{22}|^2 s_2)+h^*_{22}n_3 \quad (17.c)$$

$$h_{21}x^*_4 = c^*(h_{21}h^*_{22}s_1-|h_{21}|^2 s_2)+h_{21}n^*_4 \quad (17.d)$$

$$h^*_{32}x_5 = a(h_{31}h^*_{32}s_1+|h_{32}|^2 s_2)+h^*_{32}n_5 \quad (17.a)$$

$$h_{31}x^*_6 = c^*(h_{31}h^*_{32}s_1-|h_{31}|^2 s_2)+h_{31}n_6 \quad (17.b)$$

$$h^*_{42}x_7 = a(h_{41}h^*_{42}s_1+|h_{42}|^2 s_2)+h^*_{42}n_7 \quad (17.c)$$

$$h_{41}x^*_8 = c^*(h_{41}h^*_{42}s_1-|h_{41}|^2 s_2)+h_{41}n^*_8 \quad (17.d)$$

and then the second intermediate signal may be given by:

$$\begin{aligned} y_2 &= (h^*_{12}x_1 + h^*_{22}x_3 + h^*_{32}x_5 + h^*_{42}x_7)/a - \\ &\quad (h_{11}x^*_2 + h_{21}x^*_4 + h_{31}x^*_6 + h_{41}x^*_8)/c^* \\ &= (|h_{11}|^2 + |h_{12}|^2 + |h_{21}|^2 + |h_{22}|^2 + \\ &\quad |h_{31}|^2 + |h_{32}|^2 + |h_{41}|^2 + |h_{42}|^2)s_2 + w_2 \end{aligned} \quad (18)$$

With $$w_2 = (h^*_{12}n_1 + h^*_{22}n_3 + h^*_{32}n_7 + h^*_{42}n_8)/a - (h_{11}n^*_2 + h_{21}n^*_4 + h_{31}n^*_6 + h_{41}n^*_8)/c^*.$$

The second intermediate signal $y_2$ has no terms involving the first symbol $s_1$ and the coefficient of the term in the second symbol $s_2$ clearly indicates that estimation of the second symbol $s_2$ benefits from full eight-order spatial diversity. The second intermediate signal $y_2$ is sent to the threshold detector TD of the receiver, which generates an estimation of the value of the second symbol, denoted $\hat{s}_2$.

Finally, the estimated values $(\hat{s}_1, \hat{s}_2)$ are used to perform the maximum likelihood detection as described in the two receive antennas case explained above.

The complexity of the receiver may be reduced to M when the number of symbols in the transmission matrix given in (1a) is reduced to three, for example, by setting $s_4 = s_3$ and by applying the method described above in the case of two receive antennas. The first and the second intermediate signals have no terms involving respectively the second and the first symbols, and the estimations of the values of the first and the second symbols benefit from full fourth-order spatial diversity. By sending the first and the second intermediate signals to the threshold detector, the maximum likelihood estimate of the values of the first and the second symbols are obtained and are denoted $(\hat{s}_1, \hat{s}_2)$. Now, instead of computing the Euclidean distance $D(s_1, s_2, s_3)$ for all $(s_1, s_2, s_3)$ values, it is computed for only the $(\hat{s}_1, \hat{s}_2, s_3)$ values, with $s_3$ spanning the signal constellation. Specifically, let $s_3^k$ indicate that the third symbol takes the $k^{th}$ point of the signal constellation, where k=1,2, ..., M. The receiver computes the Euclidean distance $D(s_1, s_2, s_3)$ for all $(\hat{s}_1, \hat{s}_2, s_3^k)$, with k=1,2, ..., M. This procedure may reduce the receiver complexity from M3 to M.

According to another embodiment of the invention, the estimating method may be applied for symbols coded with a more general matrix which may be given by:

$$\begin{pmatrix} as_1 + bs_3 & -cs_2^* - ds_4^* \\ es_2 + fs_4 & gs_1^* + hs_3^* \end{pmatrix} \quad (19)$$

where a, b, c, d, e, f, g, h are complex numbers of modulus 1.

For instance, by fixing a=e and c=g in the coding matrix given by expression 19, the estimation method according to an embodiment of the invention may be performed, in the case of a MIMO system having two receive antennas, by rewriting all the equations 2.a to 9, by obtaining the estimated values of the first and the second symbols, by computing the Euclidean distances $D(s_1, s_2, s_3, s_4)$ for all the quadruplet $(\hat{s}_1, \hat{s}_2, s_3^k, s_4^p)$ (k=1,2, ... M, and p=1,2, ..., M, M being the size of the signal constellation), and by selecting the quadruplets of symbols which minimize the Euclidean distance.

It may also be possible to fix b=f and d=h in the coding matrix given by the expression 19. In this case, the values of the third and the fourth symbols may be estimated, and the Euclidean distances $D(s_1, s_2, s_3, s_4)$ for all the quadruplet $(s_1^k, s_2^p, \hat{s}_3, \hat{s}_4)$, (k=1,2, ... M, and p=1,2, ..., M, M being the size of the signal constellation), and select the quadruplet of symbols which minimizing the Euclidean distance.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method for transmitting a sequence of symbols through at least a channel in a wireless communication system, the sequence of symbols comprising at least first, second, third, and fourth symbols, the value of each symbol belonging to at least a signal constellation, the method comprising at least:

coding by forming a coding matrix with said sequence of symbols, each component of the coding matrix being a linear combination of two symbols among the first, the second, the third, and the fourth symbols, transmitting first and second components of a first column of the coding matrix through, respectively, first and second transmit antennas, at a first time slot, transmitting first and second components of a second column of the coding matrix through, respectively, the first and the second transmit antennas, at a second time slot, wherein the coding matrix is defined as:

$$\begin{pmatrix} as_1 + bs_3 & -cs_2^* - ds_4^* \\ as_2 + bs_4 & cs_1^* + ds_3^* \end{pmatrix},$$

$s_1, s_2, s_3, s_4$ being respectively the first, the second, the third and the fourth symbols, the star designating the complex conjugate, and a, b, c, d being complex numbers of modulus 1.

2. A device for implementing the transmitting method of claim 1, the device comprising:

an input node configured to receive an input signal that includes the sequence of symbols;

the first and second antennas;

first and second output nodes respectively coupled to the first and second antennas;

a coder coupled to the input node and configured to perform the coding; and a transmission circuit coupled to the coder and to the first and second output nodes and configured to perform the transmitting of the components of the first and second columns of the coding matrix.

3. A method for estimating an incoming signal corresponding to a sequence of symbols coded with a coding matrix and transmitted through a propagation channel, the sequence of symbols comprising at least first, second, third, and fourth symbols, the value of each symbol belonging to at least a signal constellation, each component of the coding matrix being a linear combination of two symbols among the first, the second, the third, and the fourth symbols, first and second components of a first column of the coding matrix being transmitted, respectively, through first and second transmit antennas at a first time slot, first and second components of a second column of the coding matrix being transmitted, respectively, through the first and the second transmit antennas at a second time slot, said propagation channel being defined by a channel matrix comprising components representing a propagation channel response between the first transmit antenna and at least first and second receive antennas, and between the second transmit antenna and at least the first and the second receive antennas, the method comprising at least:

computing a first intermediate signal from the incoming signal, said first intermediate signal being a first affine function in which the variable is the first symbol, computing a second intermediate signal from the incoming signal, said second intermediate signal being a second affine function in which the variable is the second symbol, estimating the value of the first symbol from the first intermediate signal, estimating the value of the second symbol from the second intermediate signal, selecting a set of pairs of values, each pair of values consisting in the values of two symbols belonging to the signal constellation, for each pair of values selected, calculating a Euclidean distance between the incoming signal and a noiseless signal, the noiseless signal being defined as the product of the channel matrix and the coding matrix corresponding to the selected pair of values and the estimated values of the first and the second symbols, selecting the minimal Euclidean distance among the Euclidean distances respectively calculated for the different selected pairs of values, and selecting the values of the first, second, third, and fourth symbols corresponding to the selected minimum Euclidean distance.

4. The method according to claim 3, wherein the coding matrix is defined as:

$$\begin{pmatrix} as_1 + bs_3 & -cs_2^* - ds_4^* \\ as_2 + bs_4 & cs_1^* + ds_3^* \end{pmatrix},$$

$s_1$, $s_2$, $s_3$, $s_4$ being respectively the first, the second, the third, and the fourth symbols, the asterisk designating the complex conjugate, and a, b, c, and d being complex numbers of modulus 1.

5. The method according to claim 3, wherein:

the incoming signal comprises components representing signals received at least by the first and the second receive antennas at the first and the second time slots, and the first and the second intermediate signals are computed by performing at least:

step A: for each component of the incoming signal, removing terms depending of the third and the fourth symbols which are present in said component of the incoming signal, step B1: for each result of step A, multiplying said result by one of the components of the channel matrix or by the complex conjugate of one of the components of the channel matrix, so that the coefficient of the first symbol contains a square modulus term, step B2: for each result of step A, multiplying said result by one of the components of the channel matrix or by the complex conjugate of one of the components of the channel matrix, so that the coefficient of the second symbol contains a square modulus term, step C1: computing the first intermediate signal by using all the results of step B1, and step C2: computing the second intermediate signal by using all the results of step B2.

6. The method according to claim 3, wherein the slopes of the affine functions of the first and the second intermediate signals are equal to the sum of all the square modulus of the components of the channel matrix.

7. The method according to claim 3, wherein the set of pairs of values includes all the pairs of values belonging to the signal constellation.

8. The method according to claim 3, wherein the third symbol is identical to the fourth symbol.

9. The method according to claim 3, wherein the method uses the first and the second receive antennas, and third and fourth receive antennas.

10. A device for implementing the method of claim 3 for estimating the incoming signal, the device comprising:

an input node configured to receive the incoming signal;

at least one output node configured to carry the estimated values of the first and second symbols; and an estimator coupled to the input and output nodes and configured to perform the computing of the first and second intermediate signals and the estimating of the values of the first and second symbols.

11. The method according to claim 4, wherein:

the incoming signal comprises components representing signals received at least by the first and the second receive antennas at the first and the second time slots, and the first and the second intermediate signals are computed by performing at least:

step A: for each component of the incoming signal, removing terms depending of the third and the fourth symbols which are present in said component of the incoming signal, step B1: for each result of step A, multiplying said result by one of the components of the channel matrix or by the complex conjugate of one of the components of the channel matrix, so that the coefficient of the first symbol contains a square modulus term, step B2: for each result of step A, multiplying said result by one of the components of the channel matrix or by the complex conjugate of one of the components of the channel matrix, so that the coefficient of the second symbol contains a square modulus term, step C1: computing the first intermediate signal by using all the results of step B1, step C2: computing the second intermediate signal by using all the results of step B2.

12. The method according to claim 4, wherein the slopes of the affine functions of the first and the second intermediate signals are equal to the sum of all the square modulus of the components of the channel matrix.

13. The method according to claim 5, wherein the slopes of the affine functions of the first and the second intermediate signals are equal to the sum of all the square modulus of the components of the channel matrix.

14. The method according to claim 4, wherein the set of pairs of values includes all the pairs of values belonging to the signal constellation.

15. The method according to claim 5, wherein the set of pairs of values includes all the pairs of values belonging to the signal constellation.

16. The method according to claim 6, wherein the set of pairs of values includes all the pairs of values belonging to the signal constellation.

17. The method according to claim 4, wherein the third symbol is identical to the fourth symbol.

18. The method according to claim 5, wherein the third symbol is identical to the fourth symbol.

19. The method according to claim 6, wherein the third symbol is identical to the fourth symbol.

20. The method according to claim 7, wherein the third symbol is identical to the fourth symbol.

* * * * *